United States Patent [19]

McIntosh

[11] 3,941,944

[45] Mar. 2, 1976

[54] SIGNALLING DEVICE FOR KEY TELEPHONE SYSTEMS

[76] Inventor: Alexander C. McIntosh, P.O. Box 1673, Bellevue, Wash. 98009

[22] Filed: Apr. 18, 1975

[21] Appl. No.: 569,396

Related U.S. Application Data

[63] Continuation of Ser. No. 448,036, March 4, 1974, abandoned.

[52] U.S. Cl. ......... 179/99; 179/84 VF; 179/18 AD; 179/37
[51] Int. Cl.² ........................................ H04M 1/50
[58] Field of Search ...... 179/99, 84 UF, 37, 18 AD; 340/171 R; 328/116, 117, 150; 325/346

[56] References Cited
UNITED STATES PATENTS

| | | | |
|---|---|---|---|
| 3,582,562 | 6/1971 | Sellari | 179/18 AD |
| 3,622,710 | 11/1971 | Tothill | 179/84 VF |
| 3,701,854 | 10/1972 | Anderson et al. | 179/18 AD |
| 3,780,230 | 12/1973 | Bowen et al. | 179/84 VF |
| 3,806,664 | 4/1974 | Bowen et al. | 179/84 VF |
| 3,875,347 | 4/1975 | Alaily | 179/84 VF |

*Primary Examiner*—Kathleen H. Claffy
*Assistant Examiner*—Gerald L. Brigance
*Attorney, Agent, or Firm*—Sherman Levy

[57] ABSTRACT

The present invention relates to a device which is to be used in conjunction with key telephone systems, as for example intercom systems. More particularly, the invention consists of a device for decoding the tone output from touch-tone telephones, indicating which digit has been operated and selectively signalling the called party. Special features include a minimum latching time for received signals and a time-out circuit. A relay decoding matrix is also covered with provision for accommodating either single or two digit codes. The device may be used in key telephone systems which include rotary dial equipment as well as touch-tone.

4 Claims, 2 Drawing Figures

3,941,944

SIGNALLING DEVICE FOR KEY TELEPHONE SYSTEMS

This is a continuation of application Ser. No. 448,036, filed Mar. 4, 1974, now abandoned.

BRIEF SUMMARY OF THE INVENTION

This invention is directed to an improved signal detection and calling device for use with key telephone systems, as for example, intercom systems.

The embodiment shown may utilize either single or two digit codes, providing for a system of up to 19 stations. It also provides for conference calling on both single and two digit systems and allow conference calls to be established while the system is in use.

The invention embodies a unique latching feature which assures that the calling signal remains on for at least 1 second. It also provides a time-out circuit whereby signal detection is inhibited while the detection circuit is latched in.

BACKGROUND OF THE INVENTION

In recent years the art in the field of telephone systems has been advanced through the use of tone switching systems in which the line switching and signalling information are transmitted through the telephone lines in the form of audio tones. In general, two pure tones are used in most switching systems to improve reliability and to prevent voice generated audio signals from confusing the tone detectors. In a key system, these tones originate from the depression of keys on a telephone keyboard.

An object of the present invention is to provide an improved signalling device for key telephone systems using tone detection which combines all circuit and logical functions in a single device. Another object of this invention is to provide an intercom signalling device which allows the connection of up to 19 intercom stations. Still another object of the invention is to provide an intercom signalling device which may utilize either single digit or two digit codes. A further object of the invention is to provide conference calling on both single digit and two digit systems utilizing the same device. Yet another object of the invention is to provide a device which permits conference calls to be established while the system is in use. Still another object of the invention is to provide a device in which the calling signals can be repeated without the necessity of operating the switch hook on the telephone instrument. Yet another object of the invention is to provide a device which includes a one second signal contact closure whenever an intercom signal is detected. Still another object of the invention is to provide a lock-out of imcoming signals immediately following the detection of a calling tone. Yet another object of the invention is to provide a device which may be used with rotary dial equipment on the same line as the touch-tone system. Still another object of the invention is to provide a device which is so compact and self-contained that it may be installed in a fraction of the time and at less cost than prior art systems.

BRIEF DESCRIPTION OF THE SEVERAL VIEWS OF THE DRAWINGS

The above and other objects and advantages of the invention will become apparent upon full consideration of the following detailed description accompanying the drawings in which.

DETAILED DESCRIPTION OF THE PREFERRED EMBODIMENT

Figure 1:
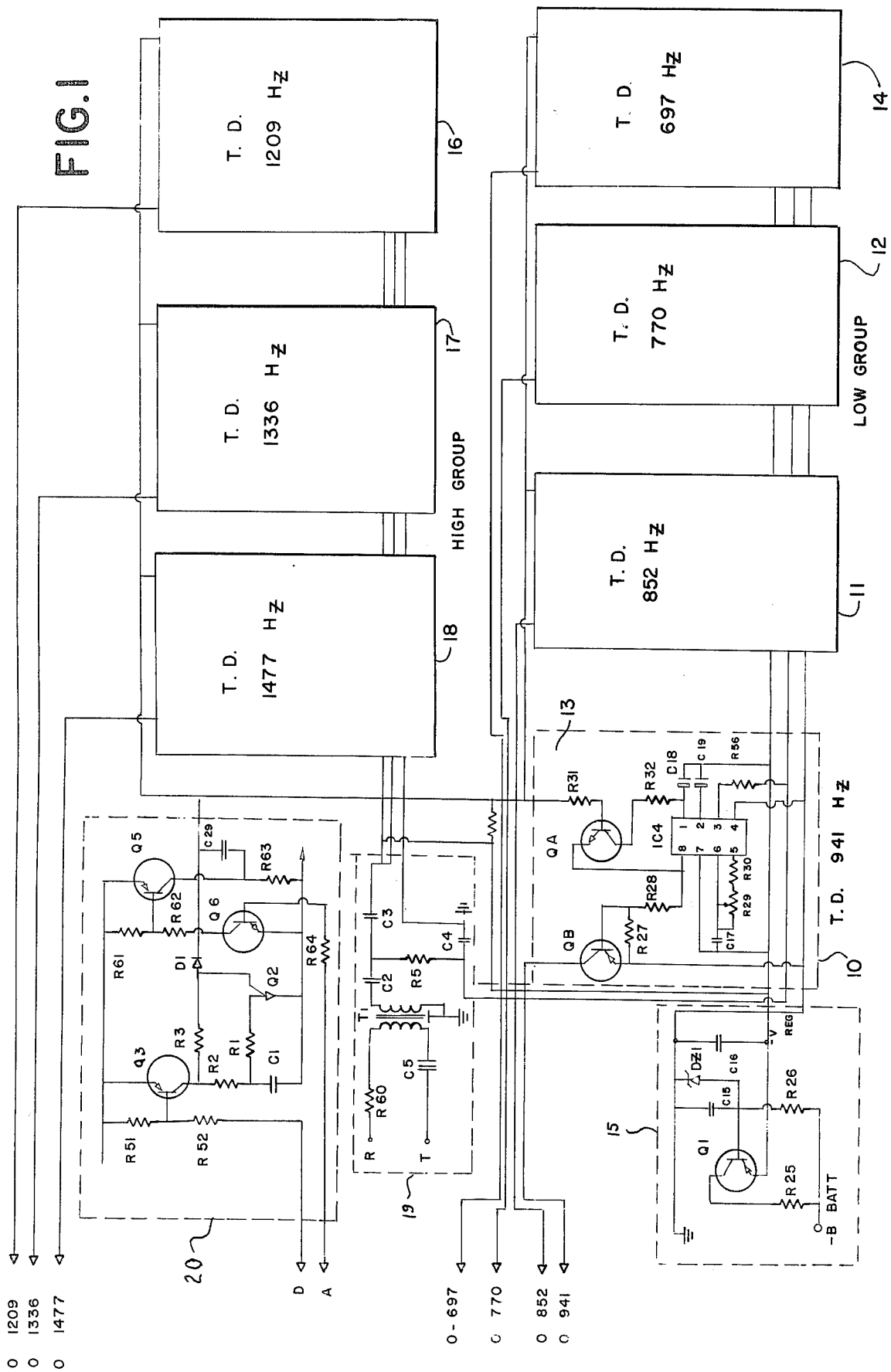
FIG. 1 is a schematic diagram of a tone decoder including regulated power supply and latching and time-out circuits, according to a preferred embodiment of the present invention.

Referring now to the drawings, at 19 on FIG. 1 is shown a connection to the telephone line in which the connection labeled R stands for the RING line and the connection T stands for the TIP line. These terms are standard in telephone systems. The circuit shown at 19 is required to convert the balanced circuit commonly used on telephone lines to an unbalanced arrangement required for tone detection. A transformer T1 serves this purpose in addition to matching the relatively high impedance of the tone decoder circuits to the 600 ohm line impedence. Capacitor C5 serves to protect the transformer from the DC voltage provided by the line feed coil. This is explained in more detail later in the description. A small resistor R60 serves to limit the peak currents into the transformer which result from line transients, etc.

Information which passes through T1 from the line consists of talking information as well as audio signalling tones. The signalling system utilized here is commonly known in the telephone art, consisting of groups of audio tones taken two at a time. Sinusoidal tones of specified frequencies are used to define each of the buttons on the telephone keyboard. The specified tones utilized are divided into a high frequency group and a low frequency group tones. The low frequency group consists of four frequencies standardized by wide spread usage in the telephone industry. These are 697 Hz, 770 Hz, 852 Hz, and 941 Hz. The high group consists of 1209 Hz, 1336 Hz,, and 1477 Hz. These frequencies are produced when the buttons are depressed on the standard ten button keyboard or pad which is in common usage throughout the United States telephone industry for so-called touch-tone dialing.

The output of transformer T1 is fed in the present embodiment into a series of tone decoders. FIG. 1 shows in block diagram form how the seven tone decoders associated with each of these seven touch-tone frequencies are connected with a common input so that signals appearing on the secondary of T1 are presented simultaneously to all seven tone decoder circuits.

Also in this embodiment of the invention, FIG. 1 shows a typical tone decoder circuit consisting of a phase locked loop tone decoder. The phase lock circuit is shown as a single component consisting of an integrated circuit available from several manufacturers. The integrated circuit is used in conjunction with several external components to select the frequency to which the circuit will rsponsive. Two external transistors are also used in each tone decoder to produce drive power and to accomplish the latch and time out functions. All seven tone decoder circuits are identical in this embodiment with the exception of those components which select the frequency to which the circuit will respond. The typical circuit is shown in FIG. 1 at 13 and each of the tone decoders is shown at 10, 11, 12, 14, 16, 17 and 18.

Signals appearing at the output or secondary side of T1 undergo a coarse separation into high and low frequency groups by means of RC filter circuits which are interposed between the transformer output and the decoder circuit busses. C2 blocks the DC ground path to the phase lock loops. R5 and C4 attenuate the high group signal while passing the low group signal through the low group buss. C3 passes the high group signals of the high group buss while attenuating the low group signals. In addition to separating the high and low groups, the filter circuits are designed to present correct signal levels to the input of the phase lock loop detectors.

The action of the tone decoder circuit can be understood best by analyzing the function of each component shown in the circuit at 13 on FIG. 1. The input to the phase locked loop integrated circuit is supplied through R56 which allows adjustment of the input signal levels from the tone decoder buss. C18 and C19 are used to establish the low frequency lock signal and also to establish the band width required for detection. Capacitor C17 in conjunction with R29 and R30 determines the frequency selection of the individual tone decoder phase locked loop. The loop output is available at pin 8 of the integrated circuit type shown in the present embodiment and is routed via R28 to the base of QB. QB serves as an amplifier which permits operation of the circuit at a higher voltage than the phase locked loop integrated circuit can safely be subjected to. QB also provides a DC reference, establishing the DC positive at ground potential in order to be compatible with most telephone system supplies.

The time out and delatching circuit is shown at 20 on FIG. 1. Q3 on this circuit establishes a positive latching ground to all tone decoder loops via R3 and D1, the common latch buss and QA transistors.

QA in each tone detector circuit is connected between pins 1 and 8 of the integrated circuit via the current limiting resistor R32. QA serves as the means by which a particular tone decoder circuit may be latched in the ON condition. Referring again to the FIG. 2, Q4 will be switched ON whenever any high loop tone decoding circuit is operating in association with any low group circuit. This provides a negative voltage at terminal D. On FIG. 1 at 20, terminal D is shown feeding the base of transistor Q3. The negative signal at terminal D initiates the latching sequence and those detector circuits which have detected the high and low group tones will be locked in the ON condition while all other of the tone decoders will not respond.

Q3 also initiates a time out function in conjunction with the programmable unijunction transistor Q2. When Q3 is switched ON, a positive potential is applied to the junction of R2 and R3. This starts a charging action in C1 and applies voltage to transistor Q2. Q2 is not conducting at this point and as a result D1 becomes forward biased. This causes the latching buss to have a potential somewhat more positive than the negative power supply voltage. C1 continues charging and in approximately 500 msec reaches a critical voltage at which pont Q2 conducts, connecting the anode of diode D1 to the negative supply voltage. This back-biases D1 and removes the positive voltage from the latching buss. This action serves to unlock the two tone decoding circuits which are detecting and opens the path through the matrix turning off Q4 shown in FIG. 2.

This action in turn removes the negative signal from terminal B turning off Q3 in the time-out and delatching circuit at 20 and restores Q2 to a normal non-conducting state.

Figure 2:
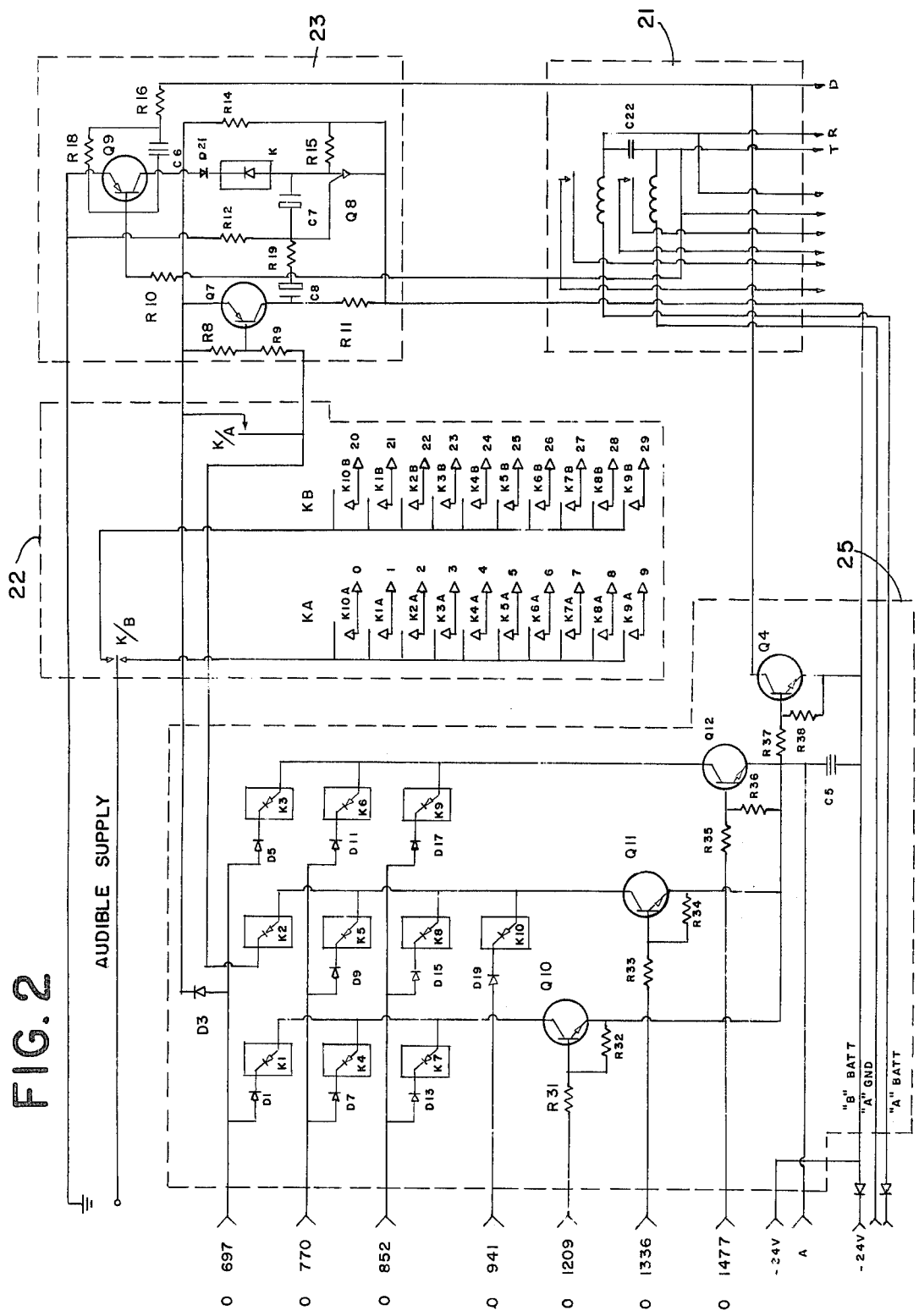
FIG. 2 is a schematic diagram of a relay matrix including provision for either one or two digit signalling and including a line-feed relay according to a preferred embodiment of the invention.

The outputs of each tone decoder circuit amplified by transistor QB. The output lines are shown on both FIG. 1 and 2. A diode/transistor matrix is shown at 25 on FIG. 2. This circuit serves to select one of ten decimal output relay coils. Each relay coil is selected as a result of the detection of a high and a low group frequency simultaneously and corresponds to one of the depressed buttons on the calling telephone keyboard. The arrangement of the matrix is such that the output of each of the high group tone decoders is amplified by transistors Q10, Q11, and Q12 respectively, one of which is activated depending upon which of the three high group tones has been detected. The collector circuits of transistors Q10, Q11, and Q12 are used to pull in a matrix of relay coils depending upon which one of the four low group frequencies has been detected. The arrangement of relay coils K1 through K10 in block of FIG. 2 illustrates the arrangement of push buttons on a common ten button touch-tone telephone instrument keyboard. By means of the matrix shown, one out of ten operated digits may be arrived at as a result of the detection of any two of the seven possible frequencies.

Referring to FIG. 2 transistors Q10, Q11, and Q12 switch the decoder high-group output grounds to the minus DC battery level. Transistors Q10, Q11, and Q12 also invert the outputs of the high-group decoders. The low-group signals are fed into the matrix through diodes and therefore do not undergo inversion. Because of this the diode and relay matrix arrangement can then be suspended between battery and ground voltages with both sides switched. Transistor Q4 is inserted at a common point in order to detect whenever any one of the relays is operated.

Each relay has two form A contact sets. One form A set in each relay is connected to a single digit buss. The other is connected to a two digit buss. Both contact sets close when the relay is operated but only the contact connected to an active buss as directed by the transfer relay will produce an output signal. This arrangement provides for 20 output signals using ten relays plus the transfer relay. Since one digit is lost in operating the transfer relay, a total of 19 relay contacts are available for switching purposes. Suppression diodes are shown bridged across each relay coil to protect the driver transistors from the inductive voltage peaks generated whenever current in the relay coils is interrupted.

In the embodiment shown, single digit stations may be selected by depression of all buttons with the exception of the digit "TWO". Detection of a digit TWO signals the system that a two digit station is involved and operates the transfer circuit in preparation for reception of the second digit. Thus, only 9 stations may be selected from a single button depression on a touch-tone telephone instrument. Referring to FIG. 2, block 22 shows the relay contacts associated with the transfer relay K. KB selects either single digit or two digit relay banks. Contact K/A permits the existence of a station 22 in the system.

The transfer circuit for two digit operation is shown in FIG. 2 at 23. Q9 is switched ON whenever the external line loop is closed. This is accomplished by connecting the base of Q9 to the TIP side of the line via R10. The TIP side of the line is normally maintained positive through one winding of the line relay coil at 21 to the ground side of the system. The TIP side of the line goes negative whenever the external line loop is completed by the insertion of a telephone instrument into the loop. This normally occurs whenever the handset is lifted from a telephone instrument connected into the line. When Q9 is switched ON, voltage is applied via D21 to the coil of the transfer relay K and to the anode of the silicon controlled rectifier Q8. Q8 is normally non-conducting. R12 connects the gate of Q8. Q8 is normally conducting. R12 connects the gate of Q8 to the ground or positive side of the DC supply. The combination of D21, relay K, and R15 forms a voltage divider by means of which the anode of Q8 is maintained at a potential lower than the gate. This maintains Q8 in a non-conducting condition.

When the tones corresponding to a digit TWO are received and decoded in the diode matrix, Q7 is switched ON since the base resistors R9 and R8 are in the matrix path for relay K2. C8 discharges through transistor Q7. When the digit TWO signal is removed, Q7 turns off and Q8 is routed towards the negative supply potential via resistor R11. This drops the gate voltage on Q8 below its anode voltage, causing it to conduct. When Q8 conducts, it pulls in the transfer relay K, causing contact K/A to close, shunting out R9, R8, and Q7. This also places relay K2 in the matrix in the event that the second digit received is another TWO. Thus, if two TWO's are depressed in sequence, the first digit TWO received will pull in the transfer relay while the second TWO will select station number 22.

Contacts K/B are also picked up with the K relay and serve to switch the audible signal supply from the single digit buss to the two digit buss feeding the signal relays. When the time-out circuit referred to above releases Q4, a positive pulse is applied to the base of Q9 via R16 and C8, momentarily turning off Q9. This cuts off the anode current of Q8 restoring Q8 to its normally off condition. Relay K is then released preparing it for the next operation. Note that the transfer relay K can also be reset when the telephone is returned to an ON hook condition, turning off Q9.

The device also includes provision for supplying talking battery voltage for the telephone instruments connected to the system. Referring to FIG. 2, block 21 includes a line feed relay coil circuit. The line feed relay usually consists of a dual winding sandwich-wound relay. A battery and A ground are fed into each winding of the line coil. The direction of current flow is such that the windings are in phase and provide a magnetic field of sufficient strength to operate the reed relays if a short circuit or a standard telephone instrument is connected across the T and R windings of the intercom line. C22 serves to bring the relay coil into resonance at the lower frequencies. The line feed relay also provides DC power for the telephones and passes all AC signals which appear across the T and R terminals of the line.

A self-contained power supply is included in the device in order to regulate the supply voltage into the phase locked loops. This is required since the device is designed to operate from telephone systems in which the voltage may be in excess of the 18-28 VDC specified on common telephone equipment. Note that all of the circuitry shown on FIG. 2 as well as the B transistors in the tone decoders operate from unregulated power available from the telephone system. Similarly, the time-out circuit described above operates from the unregulated supply but is switched during operation into the regulated supply via D1. The telephone system supply, nominally minus 24 VDC, is connected to the collector to the regulating transistor Q1 shown in FIG. 1 at block 15. A limiting resistor R25 is inserted in series with the collector. R26 provides biasing currents to the Zener diode DZ1. This provides a reference voltage at the base of Q1. Q1 is shown connected as an emitter follower. The tone decoder loops provide the load circuit. Capacitor C16 acts as a filter and storage source providing current during periods when there may be a momentary low voltage condition in the unregulated supply. Capacitor C15 filters out the low level, high frequency noise appearing at the base of Q1. System power to operate the device is supplied through the B battery input, while the A battery input provides power for telephone instruments connected into the system. In some alternative embodiments for the system, another device on the line may provide line battery power. In this case, the A battery would not be required and operation would be normal so long as the B battery is operating.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. A telephone signalling device comprising tone detection means responsive to signal tones occurring on a telephone line to which the device is connected, said signal tones emanating from one or more touch-tone telephones connected to said telephone line, means for latching responding tone detection means into the responsive state for a predetermined period of time after detection of a valid signal, said tone detection means being based upon the phase locked loop principle wherein the output of said means is proportional to the phase difference between the tone presented for test and a voltage controlled oscillator, said latching means being controlled by a relaxation circuit which determines the length of time the latch remains activated, and a matrix comprising circuit branches containing switching elements and including relay coils selectively activated by said tone detection means, respective pairs of contact sets operated by said relay coils, each arranged to connect to a telephone instrument and actuate an indicator at said telephone instrument, one set of each pair corresponding to a single digit signalling code and the other set of the pair corresponding to a two digit signalling code, transfer relay means to select either the single digit sets or the two digit sets, and means responsive to a predetermined signal tone code and its decoding to operate said transfer relay means, comprising energizing circuit means including a silicon controlled rectifier connected to said transfer relay means, means to hold the anode potential of the silicon controlled rectifier below its gate electrode potential before said predetermined signal tone code is received, and means to drop the gate electrode potential sufficiently below said anode potential when said predetermined signal tone code is decoded, to cause the silicon controlled rectifier to conduct.

2. The invention according to claim 1 wherein a line feed coil matches impedances from the telephone line to the tone detection means.

3. The telephone signalling device of claim 1, and wherein the means to hole the anode potential below the gate electrode potential comprises first voltage divider means including the transfer relay means, circuit means connecting the silicon controlled rectifier anode to a point on said voltage divider means, another voltage divider means including a normally charged capacitor, and circuit means connecting the gate electrode to a point on said second-named voltage divider means, and wherein the means to drop the gate electrode potential comprises means to discharge said capacitor responsive to the decoding of said predetermined signal code tone.

4. The telephone signalling device of claim 3, and wherein the means to discharge said capacitor comprises a transistor connected in circuit with said capacitor, and means to render said transistor conducting responsive to the decoding of said predetermined signal code tone.

* * * * *